US006175665B1

United States Patent
Sawada

(10) Patent No.: US 6,175,665 B1
(45) Date of Patent: Jan. 16, 2001

(54) IMAGE INQUIRY CIRCUIT CAPABLE OF COMPARING REFERENCE IMAGE AND RETRIEVAL OBJECT IMAGE

(75) Inventor: Akira Sawada, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/092,633

(22) Filed: Jun. 5, 1998

(30) Foreign Application Priority Data

Jun. 9, 1997 (JP) .................................................. 9-151232

(51) Int. Cl.$^7$ .............................. G06K 9/60; G06K 9/54; G06F 15/80; G06T 1/20
(52) U.S. Cl. .......................... 382/303; 382/304; 345/505; 345/506
(58) Field of Search ..................................... 382/209, 212, 382/213, 219, 221, 217, 218, 302, 303, 304, 308, 205; 348/402, 416, 699; 345/505, 506

(56) References Cited

U.S. PATENT DOCUMENTS

| | | | |
|---|---|---|---|
| 5,038,386 | * | 8/1991 | Li .......................................... 382/302 |
| 5,400,087 | * | 3/1995 | Uramoto et al. ...................... 348/699 |
| 5,535,292 | * | 7/1996 | Ranganathan et al. .............. 382/302 |
| 5,937,202 | * | 8/1999 | Crosetto .................................. 712/19 |
| 5,987,178 | * | 11/1999 | Anesko et al. ......................... 382/236 |

OTHER PUBLICATIONS

Shin–ichi Uramoto, et al., "A Half–Pel Precision Motion Estimation Processor For NTSC–Resolution Video", IEEE 1993 Custom Integrated Circuits Conference, pp. 11.2.1–11.2.4.

* cited by examiner

*Primary Examiner*—Amelia Au
*Assistant Examiner*—Mehrdad Dastouri
(74) *Attorney, Agent, or Firm*—Scully, Scott, Murphy & Presser

(57) ABSTRACT

An image inquiry apparatus includes a plurality of unit inquiry circuits arranged in a matrix of m rows and r stages (each of m and r is an integer more than 1). The plurality of unit inquiry circuits other than the unit inquiry circuits of i-th row and (i+1)-th stage ($1 \leq i \leq$ a smaller one of m and r, and i is an integer) are connected in series in units of rows. Inputs of the unit inquiry circuits of i-th rows and (i+1)-th stages are respectively connected to inputs of the unit inquiry circuits of i-th rows and i-th stages. Each of the plurality of unit inquiry circuits includes a plurality of pixel processing circuits connected in series, and outputs a calculation data corresponding to a difference between a reference pixel and a retrieval pixel which are both held therein. R summing circuits are respectively provided for the r stages of the matrix. Each of the n summing circuits sums the calculation data supplied from the pixel processing circuits in the corresponding stage to output the summing result.

15 Claims, 6 Drawing Sheets

Fig. 4A-1

| | |
|---|---|
| $a_{1p}$ ----- $a_{11}$ | |
| $a_{2p}$ ----- $a_{21}$ | |
| $a_{3p}$ ----- $a_{31}$ | |
| $a_{4p}$ ----- $a_{41}$ | |

Fig. 4A-2

| | |
|---|---|
| $a_{4p}$ ----- $a_{41}$ | |
| $a_{1p}$ ----- $a_{11}$ | |
| $a_{2p}$ ----- $a_{21}$ | |
| $a_{3p}$ ----- $a_{31}$ | |

Fig. 4A-3

| | |
|---|---|
| $a_{3p}$ ----- $a_{31}$ | |
| $a_{4p}$ ----- $a_{41}$ | |
| $a_{1p}$ ----- $a_{11}$ | |
| $a_{2p}$ ----- $a_{21}$ | |

Fig. 4A-4

| | |
|---|---|
| $a_{2p}$ ----- $a_{21}$ | |
| $a_{3p}$ ----- $a_{31}$ | |
| $a_{4p}$ ----- $a_{41}$ | |
| $a_{1p}$ ----- $a_{11}$ | |

Fig. 4B-1

| |
|---|
| 1 |
| 2 |
| 3 |
| 4 |

Fig. 4B-2

| |
|---|
| |
| |
| |
| |

Fig. 4B-3

| |
|---|
| |
| |
| |
| |

Fig. 4B-4

| |
|---|
| |
| |
| |
| |

Fig. 4C-1

| |
|---|
| 5 |
| 6 |
| 7 |
| 8 |

Fig. 4C-2

| |
|---|
| 5 |
| 2 |
| 3 |
| 4 |

Fig. 4C-3

| |
|---|
| |
| |
| |
| |

Fig. 4C-4

| |
|---|
| |
| |
| |
| |

Fig. 4D-1

| |
|---|
| 9 |
| 10 |
| 11 |
| 12 |

Fig. 4D-2

| |
|---|
| 9 |
| 6 |
| 7 |
| 8 |

Fig. 4D-3

| |
|---|
| 5 |
| 6 |
| 3 |
| 4 |

Fig. 4D-4

| |
|---|
| |
| |
| |
| |

Fig. 4E-1

| |
|---|
| 13 |
| 14 |
| 15 |
| 16 |

Fig. 4E-2

| |
|---|
| 13 |
| 10 |
| 11 |
| 12 |

Fig. 4E-3

| |
|---|
| 9 |
| 10 |
| 7 |
| 8 |

Fig. 4E-4

| |
|---|
| 5 |
| 6 |
| 7 |
| 4 |

Fig.6B

| $b_{1u}$ | ---- | $b_{qu}$ | -------- | $b_{vu}$ |
| --- | --- | --- | --- | --- |
| ⋮ | | ⋮ | | ⋮ |
| $b_{1p}$ | | $b_{qp}$ | | $b_{vp}$ |
| ⋮ | | | | ⋮ |
| $b_{11}$ | -------- | $b_{q1}$ | ---------- | $b_{v1}$ |

Fig.6A

| $a_{1p}$ | $a_{2p}$ | -------- | $a_{qp}$ |
| --- | --- | --- | --- |
| ⋮ | ⋮ | | ⋮ |
| $a_{12}$ | $a_{21}$ | -------- | $a_{q1}$ |
| $a_{11}$ | $a_{21}$ | -------- | $a_{q1}$ |

IMAGE INQUIRY CIRCUIT CAPABLE OF COMPARING REFERENCE IMAGE AND RETRIEVAL OBJECT IMAGE

BACKGROUND OF THE INVENTION

1. Field of the Invention

The present invention relates to an image inquiry circuit, and more particularly to an image inquiry circuit for retrieving an image similar to a small image from another image.

2. Description of the Related Art

An image inquiry circuit for comparing a reference image and a retrieval object image at a high speed is conventionally known. In such an image inquiry circuit, pixel processing circuits for the number of pixels of a small reference image are provided in a matrix manner. That is, the pixel processing circuits are connected to one after another in series in a column direction and finally to an image summing circuit. Also, the image processing circuits are connected to one after another in series in a row direction and a delay circuit is provided between the two adjacent rows of image processing circuits to delay an image signal by a processing time for one row.

This image inquiry circuit will be described below with reference to FIG. 1. FIG. 1 shows an example of the structure of the image inquiry circuit for comparing a retrieval object image with a reference image of a pixel array of m rows and n columns. In this image inquiry circuit, n pixel processing circuits $PE_{i1}$, $PE_{i2}$, $PE_{i3}$ ... $PE_{in}$ (i=1, 2, 3 ... m) and a delay circuit ($DL_i$) 2 are connected in series to form a row of pixel inquiry circuits. Then, the m row of pixel inquiry circuits are connected in series to form the image inquiry circuit having the pixel processing circuits of m rows and n columns. In this case, the image inquiry circuit having pixel processing circuits of m rows and n columns does not mean that the pixel processing circuits $PE_{ij}$ are arranged in m rows and n columns in space. However, it means that the image inquiry circuit can process a reference image of reference pixels arranged in a matrix manner of m rows and n columns.

Each of the pixel processing circuits 1 compares a reference pixel of the reference image with a corresponding retrieval pixel of the retrieval object image to calculate the difference between them. Then, each pixel processing circuit 1 outputs a square of the difference or an absolute value of the difference to the summing circuit (SU) 3. The summing circuit 3 performs a summing operation of the comparing results outputted from all the pixel processing circuits.

The delay circuit 2 functions as a shift register to shift received pixels in units of pixels, e.g., in units of bytes, if one pixel is represented by one byte. When the retrieval object image is read, a delay value of the delay circuit 2, namely, the number of stages of the register is set to (u–p), where u is the number of columns in the retrieval object image, and p is the number of columns in the reference image. When the retrieval object image is read into the image inquiry circuit, all the columns of retrieval pixels of the retrieval object image are shifted in a row direction to be always present in the same column of the image inquiry circuit.

In the image inquiry circuit of FIG. 1, (m×n) pixel processing circuits are provided. However, when the number of reference pixels of the reference image is smaller than (m×n), a specific value is written as "pixel non-presence data" in the pixel processing circuits in an excessive area where the reference pixels are not present. In this way, by using the above-mentioned pixel non-presence data, the outputs from the pixel processing circuits in the excessive area are excluded from the summing calculation performed by the summing circuit 3.

Referring to FIG. 1 again, the input of the first pixel processing circuit $PE_{11}$ is connected to an input terminal i of the image inquiry circuit. Also, an output of the first pixel processing circuit $PE_{11}$ is connected to an input of the second pixel processing circuit $PE_{12}$. Moreover, the processed result of each pixel processing circuit is connected to the summing circuit 3. Then, the totally processed result is outputted from the summing circuit 3 via a terminal S.

An operation of the image inquiry circuit in FIG. 1 will be described below with reference to FIGS. 6A and 6B. FIG. 6A shows a reference image having an image size of q rows and p columns. Now, it is assumed that q=m and p=n. FIG. 6B shows a retrieval object image having an image size of v rows and u columns. A portion of the retrieval object image similar to the reference image is detected by the image inquiry circuit.

In order to set the reference image in the respective pixel processing circuits shown in FIG. 1, the delay values of the respective delay circuit 2 are set to 0. Then, the reference image is supplied from the terminal i in order of $a_{1,1}$, $a_{12}$, ..., $a_{1p}$, $a_{21}$, $a_{22}$, ..., and further clock signals are supplied. Accordingly, the supplied reference image is passed through the respective pixel processing circuits connected to one after another in series. Finally, the reference image is held by the reference pixel holding circuits of the respective pixel processing circuits at a time when the pixel $a_{qp}$ is supplied.

Next, the delay value for (u–p) pixels is set in the delay circuits 2, and the retrieval object image is supplied from the input terminal i in order of $b_{11}$, $b_{12}$, ..., $b_{1u}$, $b_{21}$, $b_{22}$, ..., At a time when the pixel $b_{qp}$ is inputted from the terminal i, the retrieval pixels $b_{11}$ to $b_{qp}$ are held by (q×p) pixel processing circuits 12.

At that time, the differences between the reference pixel of the reference image and the retrieval pixel of the retrieval object image is calculated by each of the pixel processing circuits and then the summation of the squares of the differences is calculated by the summing unit 3. The summing result is outputted from the terminal S. Hereinafter, each time one retrieval pixel is supplied from the terminals i, the supplied retrieval pixels of the retrieval object image are compared with the reference pixels of the reference image. It should be noted that a comparison position is considered with respect to the pixel $a_{11}$. Thus, the comparison position when the pixel $a_{11}$ with the pixel $b_{yx}$ are compared is represented by (y–1, x–1).

There are the following problems in the conventional image inquiry apparatus. That is, there is a case where a plurality of image inquiry circuits, each of which shown in FIG. 1, are operated in parallel so as to increase the processing speed. In this case, the image inquiry is performed to regions of the retrieval object image by the respective image inquiry circuits. In the boundary between the regions of the retrieval object image, the pixels of the regions of the retrieval object image must be supplied in duplication to compare the retrieval object image with the reference image. As a result, this requires a data transferring ability which exceeds the parallel degree of the image inquiry circuits.

The reason why the regions of the retrieval object image must be supplied in duplication will be described below. For example, it is assumed that q=8 and v=256 in FIGS. 6A and 6B. In this case, there are comparison positions in a range between 0 and 248 in a vertical direction. If the comparison positions is divided into 2 groups to allow the retrieval object image to be inquired by use of two image inquiry circuits, two groups between 0 and 123 and between 124 and 248 are provided, for example. However, in the comparison position 123, the comparison between $a_{1,1}$ and $b_{124,1}$ is performed. Hence, it is necessary to supply 8 retrieval pixels of a portion of the retrieval object image from the pixel $b_{124,1}$ to the pixel $b_{131,u}$ in order to obtain that comparison result. That is, in the boundary row, it is necessary that the retrieval pixels for (q−1) rows are supplied in duplication. Thus, the duplicate amount is increased in conjunction with the increase of the number of the boundaries.

Also, there is another problem in the conventional image inquiry circuit. It is difficult to increase a transferring rate of the retrieval pixels since the parallel degree is increased so that a load on a data transfer bus becomes larger. The reason thereof will be described below. In general, the data transfer bus is constructed so as to collectively transfer the retrieval pixels adjacent to each other in horizontal and vertical directions. For example, 8 pixels each having 8 bits are collectively transferred on the bus having a 64-bit width. Hence, latch circuits for a bus bit width are normally provided in front of the input terminals i of FIG. 1. For example, the retrieval pixels are transferred to the terminal i one by one after the eight pixels are stored in the latch circuits from the bus.

There is a case that eight image inquiry circuits, each of which is shown in FIG. 1, are provided in parallel to each other, and the latches having the width of the eight pixels are connected to the input terminal i of each image inquiry circuit. If the data for the eight pixels is circulated through each of the image inquiry circuits for each clock, the respective image inquiry circuits can receive the data for every eight clocks. In this case, the supply rate of the data is equal to the processing rate of the data. However, if a clock frequency is tried to be increased higher for high speed processing, a bus driving circuit is required to have a large driving ability such that the eight loads or latches can be driven. Actually, it is necessary that the bus width is made to be double, and the frequency of the clock signal is decreased.

SUMMARY OF THE INVENTION

The present invention is made in view of the above problems. Therefore, an object of the present invention is provide to an apparatus and method for inquiring an image in which the above-mentioned duplicate data and the load of the data transfer bus can be reduced.

In order to achieve an aspect of the present invention, an image inquiry apparatus includes a plurality of unit inquiry circuits arranged in a matrix of m rows and r stages (each of m and r is an integer more than 1). The plurality of unit inquiry circuits other than the unit inquiry circuits of i-th row and (i+1)-th stage ($1 \leq i \leq$ a smaller one of m and r, and i is an integer) are connected in series in units of rows, and inputs of the unit inquiry circuits of i-th rows and (i+1)-th stages are respectively connected to inputs of the unit inquiry circuits of i-th row and i-th stage. Each of the plurality of unit inquiry circuits includes a plurality of pixel processing circuits connected in series, and outputs a calculation data corresponding to a difference between a reference pixel and a retrieval object pixel which are both held therein. The image inquiry apparatus further includes r summing circuits respectively provided for the r stages of the matrix, wherein each of the r summing circuits sums the calculation data supplied from the pixel processing circuits in the corresponding column to output the summing result.

The image inquiry apparatus may further include a delay circuit provided between every two connected in series of the plurality of unit inquiry circuits to delay transfer of the retrieval pixels from the one unit inquiry circuit to the other unit inquiry circuit.

Each of the pixel processing circuits includes a first pixel holding circuit, a second pixel holding circuit, a subtracting circuit and a calculating circuit. The first pixel holding circuit holds a supplied pixel in response to a first clock signal and outputs the held pixel. The second pixel holding circuit is connected to an input of the first pixel holding circuit, and holds the supplied pixel in response to a second clock signal. The subtracting circuit performs subtraction between the pixel held in the first pixel holding circuit and the pixel held in the second pixel holding circuit to output a subtraction result. The calculating circuit calculates a square or absolute value of the subtraction result supplied from the subtracting circuit to output as the calculation data. In this case, each of the pixel processing circuits may further includes a gate for selectively outputting the calculation data supplied from the calculating circuit in response to an output control data, and a detecting circuit for detecting that a data held in the second holding circuit is the pixel, to output the output control data.

The image inquiry apparatus further includes a control circuit, which generates the first clock signal when the pixel supplied to each of pixel processing circuits of the matrix should be transferred to a next pixel processing circuit. The control circuit also generates the second clock signal when the pixel supplied to each of the pixel processing circuits of the matrix should be held in each of the pixel processing circuits.

The image inquiry apparatus further includes a pixel supply unit, which supplies k rows ($1 \leq k \leq$ a smaller one of m and r) of a reference image of the reference pixels to be cyclically held in each of the k stages of the matrix from the first stage such that (p+q) or (p+q+k) is constant, where p is an integer to satisfy $1 \leq p \leq m$, q is an integer $1 \leq q \leq m$, the q-th row of the reference image is located at a top of the p-th stage of the matrix. In this case, after the supply of the reference image, the pixel supply unit supplies a retrieval object image in units of k rows to be held in the matrix. When new k rows of the retrieval object image are supplied, the held k rows are shifted in a row direction.

The image inquiry apparatus may be composed of a plurality of semiconductor devices connected in series. In this case, each of the plurality of semiconductor devices includes the m unit inquiry circuits for one stage, the summing circuit for the one stage, and a control signal generating circuit for generating a selection control signal for each of the m unit inquiry circuits. Also, each of the m unit inquiry circuits includes the plurality of pixel processing circuits connected in series, a delay circuit connected to an output of a last one of the plurality of pixel processing circuits, a selector for selecting one of an output of the delay circuit and an input of a first one of the plurality of pixel processing circuits in response to the selection control signal.

In order to achieve another aspect of the present invention, a method of inquiring a reference image with a retrieval object image, includes the steps of:

providing image inquiry circuits of i stages, wherein each of the i stages includes unit inquiry circuits of j rows, each of the unit inquiry circuits including k pixel processing circuits connected in series;

setting a reference image composed of reference pixels in each of the image inquiry circuits such that a m-th row ($1 \leq m \leq j$, m is an integer) of the reference image is set in a (m+r−1)-th row ($1 \leq r \leq i$, r is an integer) of the image inquiry circuit of a r-th stage when $(m+r-1) \leq j$, and in a (m+r−1−j)-th row ($1 \leq r \leq i$, r is an integer) of the image inquiry circuit of a r+th stage, when $(m+r-1) > j$;

after the setting of the reference image, setting a first group of j rows of a retrieval object image composed of retrieval pixels in the j rows of the image inquiry circuit of a first stage;

calculating a calculation data corresponding to a difference between the set reference pixel and the set retrieval pixel in each of the pixel processing circuits of the image inquiry circuit of the first stage; and summing the calculation data supplied from the pixel processing circuit of the first stage to output the summing result.

Each of the pixel processing circuits may include a first pixel holding circuit and a second pixel holding circuit. The first pixel holding circuit holds a supplied pixel in response to a first clock signal and outputs the held pixel, and the second pixel holding circuit is connected to an input of the first pixel holding circuit, and holds the supplied pixel in response to a second clock signal. When the reference image is set, each of the reference pixels is transferred from one of the pixel processing circuits to a next one of the pixel processing circuits by use of the first holding circuit. Also, the transferred reference pixel is held in the second holding circuit.

When the calculating step is executed, subtraction is performed between the retrieval pixel held in the first pixel holding circuit and the reference pixel held in the second pixel holding circuit to output a subtraction result. Then, a square or absolute value of the subtraction result is calculated and outputted as the calculation data. Further, in the calculation, it is detected that a data held in the second holding circuit is not the reference pixel, to output an output control data, and the calculation data is inhibited from being outputted.

In addition, a next group of j rows of the retrieval object image may be set to the j rows of the image inquiry circuit of the first stage while transferring the groups of j rows of the retrieval object image which are already set to a next stage in the row direction. In this case, all the rows of the group of j rows set in the (s−1)-th stage ($1 \leq s \leq j$, s is an integer) other than the (s−1)-th row are transferred to the k-th stage, and the same row as set in the (s−1)-th row of the (s−1)-th stage is set to the (s−1)-th row of the s-th stage. Also, when the next group of j rows of the retrieval object image is set, executing the calculating step and the summing step. In this case, transfer of the reference pixels between two of adjacent states in a row direction may be delayed.

Further, the step of setting a next group of retrieval object image and the executing step may be repeated over an entire of the retrieval object image.

BRIEF DESCRIPTION OF THE DRAWINGS

FIGS. 4A-1 to 4A-4 are diagrams illustrating the setting state of a reference image in four stages in the image inquiry apparatus according to the first embodiment of the present invention;

FIGS. 4B-1 to 4E-4 are diagrams illustrating the change of the setting state of a retrieval object image in the four stages in the image inquiry apparatus according to the first embodiment of the present invention;

FIG. 6A is an example of the reference image processed by the image inquiry circuit of the present invention; and FIG. 6B is an example of a retrieval object image processed by the image inquiry circuit of the present invention.

DESCRIPTION OF THE PREFERRED EMBODIMENTS

The image inquiry circuit of the present invention will be described below in detail with reference to the attached drawings.

Figure 2:
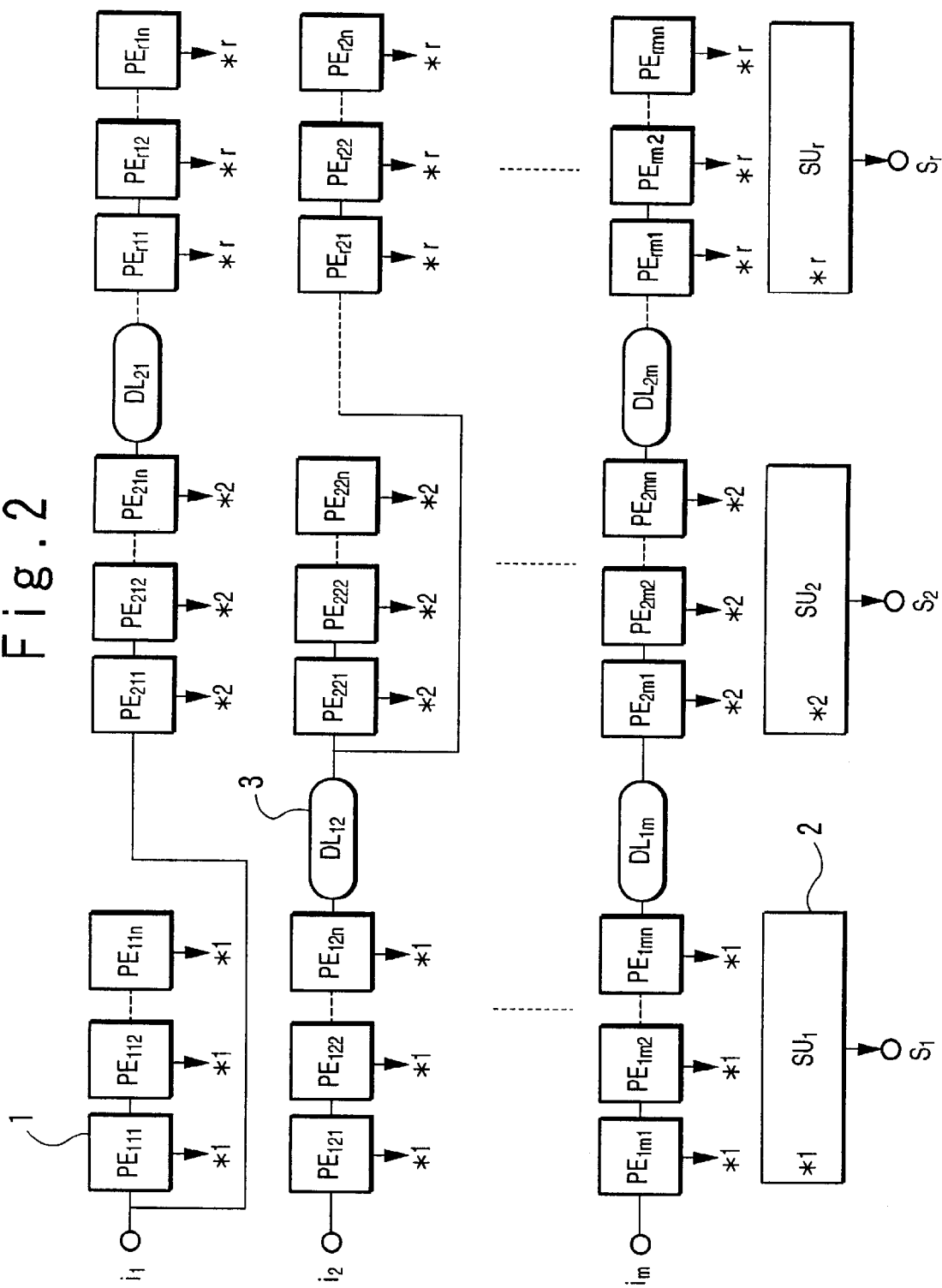
FIG. 2 is a block diagram showing the structure of an image inquiry apparatus according to a first embodiment of the present invention.

FIG. 2 is a block diagram illustrating the structure of the image inquiry circuit according to the first embodiment of the present invention. Referring to FIG. 2, in the image inquiry circuit of the first embodiment, n image processing circuits PEs (n is a positive integer) are connected to one after another in series. A group of n image processing circuits PEs is set as a unit inquiry circuit. The r unit inquiry circuits (r is a positive integer more than 1) are provided for r stages, and are connected to one after another in series in a row horizontal direction to constitute a row inquiry circuit. However, an input of the (i−1)-th row of the i-th stage (i is an integer more than 1) is connected to an input of the (i−1)-th row of the (i−1)-th stage. Further, the m row inquiry circuits (m is a positive integer) are arranged in a column or vertical direction so as to perform the image inquiry in parallel.

Further, r summing circuits are provided for r stages, respectively. Each of the r summing circuits performs summation of the outputs of the pixel processing circuits in the corresponding stage.

In the following descriptions and FIG. 2, a pixel processing circuit is represented by $PE_{ijk}$. Here, a subscript k represents a number of the pixel processing circuit in the unit inquiry circuit. Also, j represents a number of the row inquiry circuit in which the pixel processing circuit is contained, and i represents a stage number of the unit inquiry circuit in which the pixel processing circuit is contained. Thus, k=1, 2 ... n, j=1, 2 ... m, and i=1, 2 ... r. It is assumed that r=m, in order to clarify the advantageous effect of the present invention. However, r may be equal to or smaller than m.

As can be seen from FIG. 2, the pixel processing circuits belonging to the same stage number in the m row inquiry circuits are arranged in a form of a matrix having m rows and n columns. For example, the pixel processing circuits having a stage number of 2 in the m row inquiry circuits are arranged as mn pixel processing circuits $PE_{2jk}$ (k=1, 2 ... n, and j=1, 2 ... m) at a center portion of FIG. 2 in a form of a matrix. In the following descriptions, a matrix array of this pixel processing circuits is referred to as a circuit matrix. As described later, the image inquiry is performed by reading the reference image and the retrieval object image into this circuit matrix. Thus, the summing circuit 3 is provided for each of the circuit matrixes, namely, for each stage.

Calculation data corresponding to the comparing results from each pixel processing circuit are summed by the summing circuit 3 and the summing result is outputted to a terminal $S_i$ (i is a stage number). A delay circuit 2 functions as a shift register operating in units of pixels or a first-in first-out register, similarly to the conventional image inquiry circuit in FIG. 1. The number of delay stages thereof is set to the value equal to the subtracting result of the number n of columns in the circuit matrix from the number u of columns in the retrieval object image when the retrieval object image is written into the circuit matrix.

Figure 3:
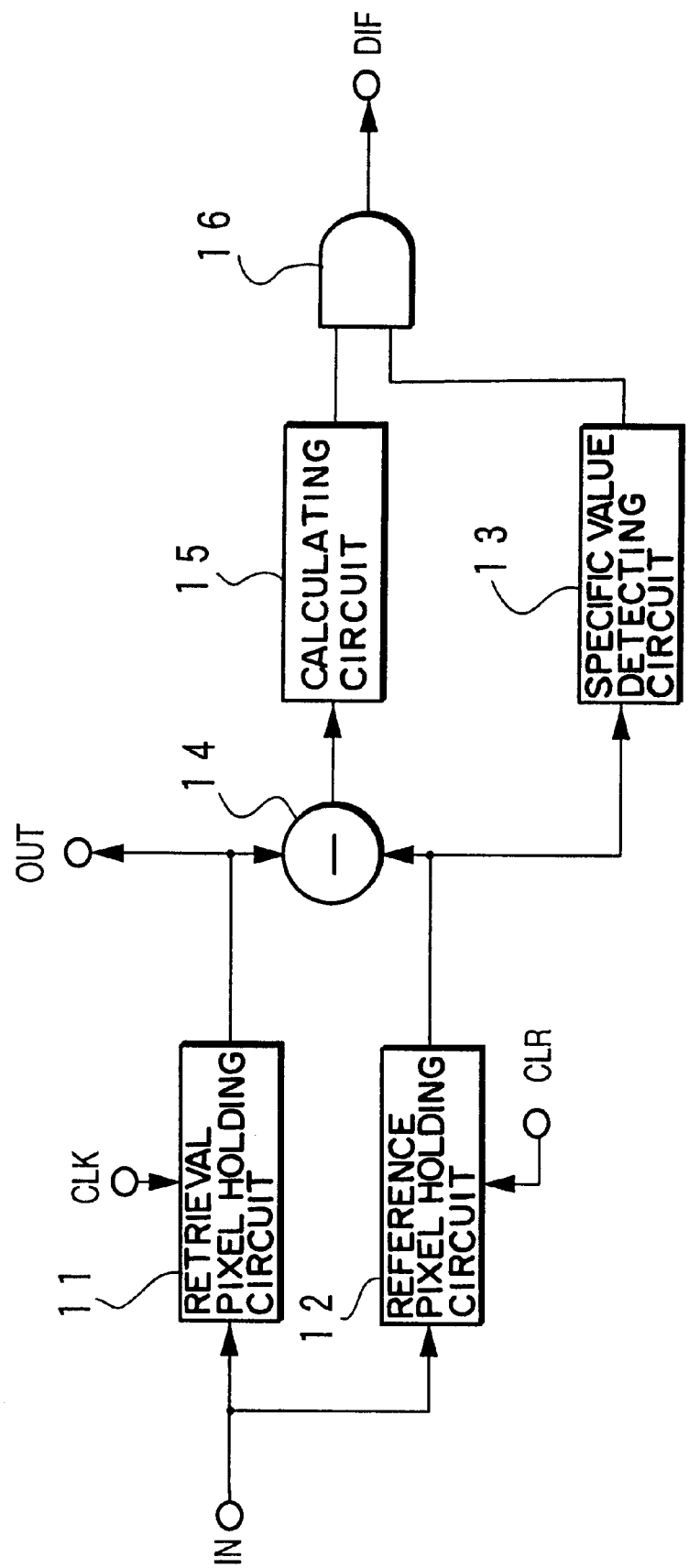
FIG. 3 is a block diagram showing the structure of a pixel processing circuit used in the image inquiry apparatus according to the first embodiment of the present invention.

FIG. 3 is a block diagram showing an actual example of the pixel processing circuit 1. A retrieval pixel holding circuit 11 holds a retrieval pixel of a retrieval object image. A reference pixel holding circuit 12 holds a reference pixel of a reference image. Inputs of the holding circuits 11 and 12 are connected to an input terminal IN of the pixel processing circuit 1. These holding circuits 11 and 12 receive the pixels from the input terminal IN in synchronous with clock signals CLK and CLR, respectively. The output from the retrieval pixel holding circuit 11 is connected to a pixel data output terminal OUT of the pixel processing circuit 1 to output the held pixel.

A subtracting circuit 14 calculates a difference between the retrieved pixel held in the holding circuit 11 and the reference pixel held in the holding circuit 12. A calculating circuit 15 calculates a square of the difference or an absolute value of the difference from the subtraction circuit 14. A specific value detecting circuit 13 detects a predetermined specific value of the reference pixel. The specific value detecting circuit 13 generates an output inhibit control signal when a pixel non-presence data as the specific value is held by the reference pixel holding circuit 12. As a result, the output from an output terminal DIF of the pixel processing circuit 1 is excluded from the summing calculation by the summing circuit 3 shown in FIG. 2. A gate circuit 16 allows the output supplied from the calculating circuit 15 to be outputted except for the case that the specific value detecting circuit 13 detects the specific value from the output of the reference pixel holding circuit 12.

The connection of the pixel processing circuits in the first embodiment of the present invention will be described below with reference to FIG. 2. At first, the m row inquiry circuits are connected to input terminals $i_1$ to $i_m$ to receive pixels, respectively. Each unit inquiry circuit is composed of the n pixel processing circuits and is connected through the delay circuit to the next unit inquiry circuit at a next stage, similarly to the image inquiry circuit in FIG. 1, except a row order conversion connection section described below.

There is one row order conversion connection section at each stage. An input of a (x−1)-th unit inquiry circuit ($1 \leq x \leq$ a smaller one of m and r) at an x-th stage is connected to an input of a (x−1)-th unit inquiry circuit at the previous stage. In the following descriptions, an s-th unit inquiry circuit at an r-stage is referred to as a [rs] inquiry circuit. Thus, for example, the same pixels are inputted to an input of a [21] inquiry circuit and an input of a [11] inquiry circuit in FIG. 2. As a result, the [11] inquiry circuit and the [21] inquiry circuit hold the same pixels in a condition that clock signals is sent to the circuit matrixes at the first and second stages.

Figure 1:
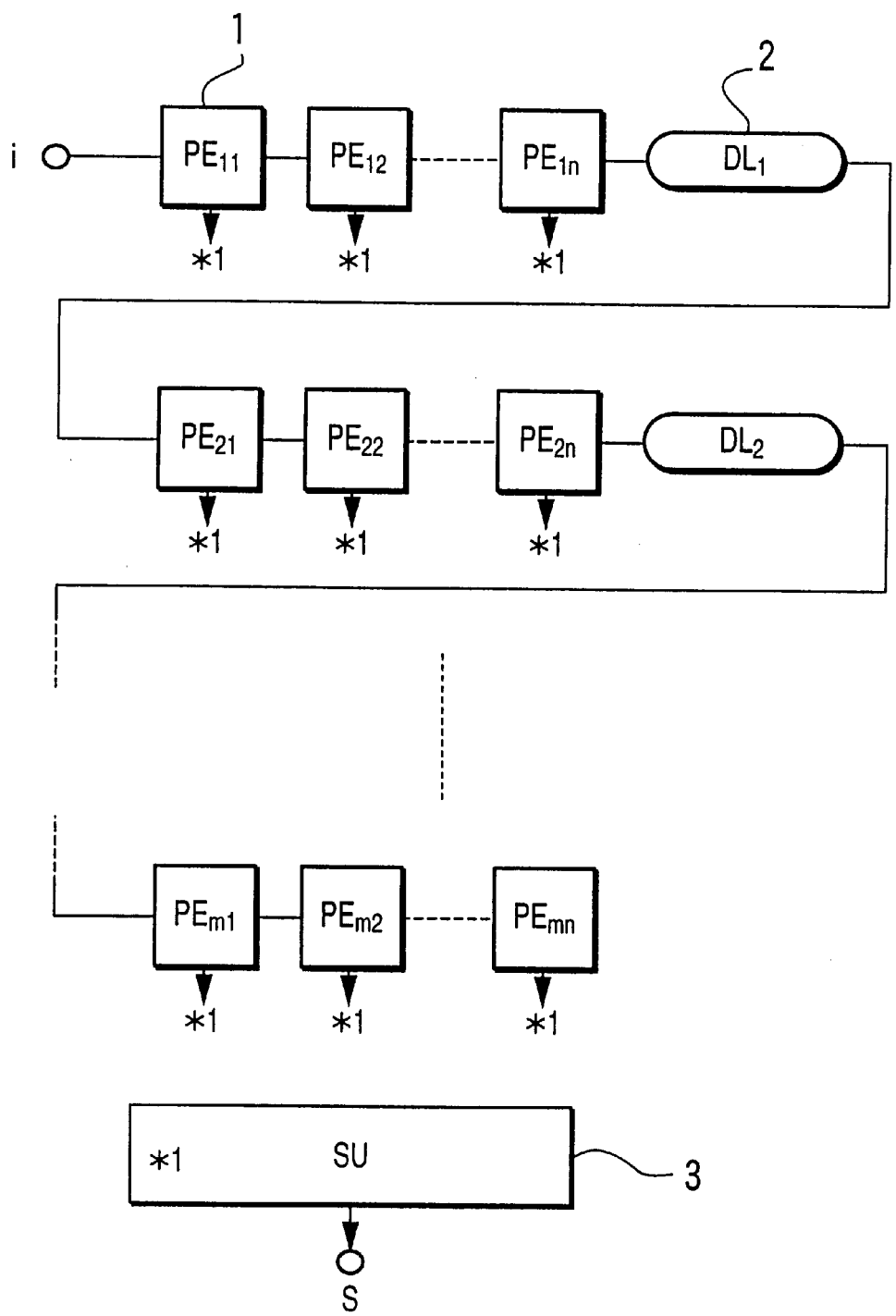
FIG. 1 is a block diagram showing the structure of a conventional image inquiry circuit.

Next, an operation of the image inquiry circuit in FIG. 2 will be described below with reference to FIGS. 2, 3, 4A-1 to 4E-4. FIGS. 4A-1 to 4A-4 are diagrams showing the holding state of the reference pixels of the reference image in the 4-stage circuit matrixes in the image inquiry apparatus shown in FIG. 2, in a case of r=4 and m=4. Typically, an actual value of m or r is equal to or more than 8. However, in FIGS. 4A-1 to 4A-4, it is assumed that m=4 and r=4 for simplicity of the description.

FIGS. 4A-1 to 4A-4 represents how to set a reference image having 4 rows and p columns to the circuit matrix at each stage. Each of four divided small portions in each figure corresponds to one unit inquiry circuit. Hence, in FIGS. 4A-1 to 4E-4, four small portions arranged in a horizontal or row direction constitute one row inquiry circuit. Also, four row inquiry circuits are arranged in a vertical or column direction to thereby constitute the image inquiry circuit of the circuit matrix.

It is assumed that the rows of the reference image are composed of $(a_{11}, a_{12}, \ldots a_{1k} \ldots a_{1p})$, $(a_{21}, a_{22}, \ldots a_{2k}, \ldots a_{2p})$, $(a_{31}, a_{32}, \ldots, a_{3k}, \ldots a_{3p})$ and $(a_{41}, a_{42}, \ldots a_{4k}, \ldots a_{4p})$, respectively. That is, the reference images for 4 stages are set in the image inquiry apparatus shown in FIG. 2 such that a x-th row ($1 \leq x \leq 4$) of the reference image shown in FIG. 6A is set to a (x+r−1)-th row of ($1 \leq r \leq 4$) the circuit matrix of the r-th stage.

As shown in FIGS. 4A-1 to 4A-4, the reference images (q=4 in FIG. 6A) for 4 stages are supplied from an image supply unit (not shown) to the input terminals $i_1$ to $i_m$. In each pixel processing circuit, the reference pixel is supplied from one of the input terminals $i_1$ to $i_m$ or from the output terminal OUT of a previous pixel processing circuit. The retrieval pixel holding circuit 11 outputs the reference pixel held therein from the output terminal OUT and then holds the reference pixel in response to a control signal CLK which is generated by a control circuit (not shown). Thus, the reference pixel $a_{21}$ can be transferred from the pixel processing circuit $PE_{111}$ to the last pixel processing circuit $Pe_{r1n}$ of the row pixel inquiry circuit by use of the retrieval pixel holding circuit 11. In the last pixel processing circuit $Pe_{r1n}$, the reference pixel $a_{21}$ is held in the reference pixel holding circuit 12 in response to the clock signal CLR which is generated by the control circuit (not shown). The same process is performed all the reference pixels for 4 stages.

More specifically, the reference image is set to the circuit matrix at each stage, at the beginning of the image inquiry. Now, it is assumed that the reference image is typically composed of a pixel array having q rows and p columns and m=q and n=p in this example. The number of delay stages is set to 0 in each of the delay circuits 3. The rows of the reference image are supplied from the image supply unit (not shown) to the terminals $i_1$ to $i_m$, respectively, (the leads thereof are $a_{11}$ to $a_{q1}$). Then, remaining (p−1) pixels of the reference image for each row are supplied to each row of the circuit matrix at the first stage. The method of controlling the pixel processing circuit is already explained. At the same time, the clock signal CLK and CLR are given to the two terminals of the holding circuits 11 and 12. The pixel is supplied in synchronous with the clock signal. Then, when the p pixels for one row to of the reference image are set in the row of the circuit matrix, the clock signal is made inactive.

Similarly, in the second to r-th stages, the reference image is set for each circuit matrix at each stage. In this case, the reference image is set to each row of the circuit matrixes in a circulation manner, as described above. Here, the circulation implies the manner of determining a row order in such a manner that a last row is situated at a row previous to a first row. Thus, for example, a row of reference pixels $a_{q1}$ to $a_{qp}$ (last rows) are set for the unit inquiry circuit $PE_{21n}$ to $PE_{211}$ (top rows) of the second stage, and a row of reference pixels $a_{11}$ to $a_{1p}$ are set for the unit inquiry circuit $PE_{22n}$ to $PE_{221}$.

At the r-th stage, the row of reference pixels $a_{11}$ to $a_{1p}$ are set for the unit inquiry circuit $PE_{rmn}$ to $PE_{rm1}$, and the row of reference pixels $a_{21}$ to $a_{2p}$ are set for the unit inquiry circuit $PE_{r1n}$ to $PE_{r11}$.

Thus, when this setting method applied to the examples of FIG. 4A-1 to 4A-4, the unit inquiry circuit $PE_{21n}$ to $PE_{211}$ correspond to the unit inquiry circuit on the first row at the second stage. $a_{q1}$ to $a_{qp}$ correspond to $a_{41}$ to $a_{4p}$ (q=4). $PE_{mmn}$ to $PE_{mm1}$ correspond to the unit inquiry circuit on the fourth row (m=4) at the fourth stage, in the example of FIGS. 4A-1 to 4A-4. $PE_{m1n}$ to $PE_{m11}$ correspond to the unit inquiry circuit on the first row at the fourth stage, in FIG. 4A-1 to 4A-4. As shown in FIG. 4A-1 to 4A-4, in this example, each row of the reference image is set to the circuit matrix at each stage such that the shifting operation is performed for one row in conjunction with increase of the stage number by one.

Next, FIGS. 4B-1 to 4E-4 are diagrams showing steps of writing the retrieval object image. FIGS. 4B to 4E show steps at which the retrieval object image is written into the circuit matrixes from the first stage to the fourth stage in order. The number written in each of the divided small portions shows a row number of the retrieval object image written to each unit inquiry circuit. Also, FIGS. 4B-1 to 4B-4 correspond to 4 stages.

The delay value for (u–p) pixel is set to each delay circuit, and then the retrival object image shown in FIG. 6B is supplied from the image supply unit (not shown) to the input terminals $i_1$ to $i_m$ every m rows without the duplication, as shown in FIGS. 4B-1 to 4E-4. This process causes the first to m-th rows of the retrieval object image to be sequentially set into the first to m-th rows of the circuit matrix at the first stage. If m=4, it is as shown in FIGS. 4B-1. In FIG. 4B-1, numbers 1 to 4 denote the first to fourth rows of the retrieval object image, respectively.

The pixels at the n-th columns on the first to m-th rows are supplied and set in the retrieval pixel holding circuit 11 of each of the pixel processing circuits of the first stage. At this time, each pixel processing circuit at the first stage performs a comparing process for a comparison position [00], and the comparing result is outputted from the summing circuit $SU_1$ via the terminal $S_1$. That is, in the example shown in FIGS. 4B-1, in this comparing process, the rows of retrieval pixels 1, 2, 3 and 4 written to the respective rows of the circuit matrix at the first stage as shown in FIG. 4B-1 are compared with the reference pixels written to the respective rows of the circuit matrix at the first stage shown in FIG. 4A-1. The comparing process at this time is a process for comparing between the reference pixels $a_{11} \ldots a_{qp}$ of the reference image and the retrieval pixel $b_{11} \ldots b_{qp}$ of the retrieval object image.

After that, each time one pixel is supplied from the image supply unit via the respective input terminals $i_1$ to $i_m$, the comparing result at the comparison position shifted in a row direction is outputted.

After the operation shown in FIG. 4B-1 is ended, pixels on (m+1)-th to 2m-th rows of the retrieval object image are supplied from the image supply unit via the input terminals $i_1$ to $i_m$, respectively.

Subsequently, the comparing operation shown in FIGS. 4C-1 and 4C-2 is started. When the pixels on the (m+1)-th to 2m-th rows of the retrieval object image are set, the pixels of the rows excluding the first row of the retrieval object image set into the circuit matrix at the first stage at the step P1 are set into the rows of the circuit matrix at the second stage through the delay circuits 2. However, as mentioned above, the input of the unit inquiry circuit for the first row of the second stage is connected to the input of the corresponding row of the previous stage by the row order conversion connection. That is, the input of the unit inquiry circuit for the first row of the second stage is connected to the input of the unit inquiry circuit for the first row of the first stage. Hence, the retrieval pixels on the first row at the first stage, that is, the (m+1)-th row of the retrieval object image is set into the first row at the second stage. Thus, as shown in FIG. 4C-2, m+1, 2, 3, 4 are set into the circuit matrix at the second stage in order of rows.

On the other hand, the reference pixels on the respective rows of the reference image are set into the retrieval pixel holding circuits 12 of the circuit matrix at the second stage, in order of 4 (m), 1, 2 . . . 3 (m−1). As a result, (m+1, 2, 3, . . . m)-th rows of the retrieval object image are compared with (m, 1, 2 . . . m−1)-th rows of the reference image. This comparison is equivalent to a comparison between (2, 3 . . . m, m+1)-th rows of the retrieval object image and (1, 2 . . . m−1, m)-th rows of the reference image, that is, the comparison at a vertical comparison position 1.

The above-mentioned operations will be performed below in accordance with the explanation of the example shown in FIGS. 4A-1 to 4E-4. The fifth, sixth, seventh and eighth rows of the retrieval object image are set from the image supply unit via the input terminals $i_1$ to $i_m$ as shown in FIG. 4C-1. The second, third and fourth rows among the rows of the retrieval object image already set into the circuit matrix at the first stage as shown in FIG. 4B-1, are set into the second stage. However, the first row of the circuit matrix at the first stage, that is, the fifth row of the retrieval object image is set into the first row of the circuit matrix at the second stage, by the row order conversion connection. As a result, the fifth, second, third and fourth rows of the retrieval object image are set into the circuit matrix at the second stage, in the above-mentioned order.

On the other hand, the fourth, first, second and third rows of the reference image are held by the reference pixel holding circuit of the circuit matrix at the second stage, in the above-mentioned order (referring to FIG. 4A-2). Therefore, as shown in FIGS. 4C-1 and 4C-2, the fifth, second, third and fourth rows of the retrieval object image are compared with the fourth, first, second and third rows of the reference image, by the circuit matrix at the second stage. This comparing process is equivalent to a comparison between the second, third, fourth and fifth rows of the retrieval object image and the first, second, third and fourth rows of the reference image. That is, the comparison at a vertical comparison position 1 is performed by the circuit matrix at the second stage.

As mentioned above, as shown in FIGS. 4C-1 and 4C-2, the (m+1)-th to 2m-th rows of the retrieval object image are compared with the first to (m+1)-th rows of the reference image, by the circuit matrix at the first stage. Thus, at a time point when the n-th pixels of the (m+1)-th to 2m-th rows are inputted, the comparing process is performed at a comparison position (m,0) by the circuit matrix at the first stage. Then, the comparing result is outputted from the summing circuit $SU_1$ via the terminal $S_1$. At the same time, the comparing process is performed at a comparison position (1,0) by the circuit matrix at the second stage, and the comparing result is outputted from the summing circuit $SU_2$ via the terminal $S_2$.

When the four rows are supplied from the beginning of the retrieval object image, only the first stage is effective, and the comparison at a vertical comparison position 0 is performed. When the fifth to eighth rows are inputted, the comparison at a vertical comparison position 4 is performed at the first stage. However, the second to fifth rows are inputted to the second stage, and the comparison at the vertical comparison position 1 is performed. This reason will be described below.

That is, while the second to fourth rows are inputted through the delay circuits to the second stage in the state in which the row order is maintained, the fifth row of the retrieval object image is supplied to the first row of the circuit matrix at the second stage.

Similarly, when the ninth to twelfth rows are supplied, the corresponding rows of the circuit matrix at the previous stage corresponds are inputted through the delay circuit to the first, third and fourth rows of the circuit matrix at the third stage. The same row at the stage previous to the present stage, that is, the sixth row is inputted to the second row of the circuit matrix at the third stage. Hence, the comparison at a vertical comparison position 2 is performed at the third stage. Moreover, when the thirteenth to sixteenth rows are inputted, the comparison at a vertical comparison position 3 is performed at the fourth stage.

The structure of the image inquiry apparatus in the first embodiment will be described below in detail. In this case, m and n are both assumed to be 8 or more in FIG. 5, and the summing circuit 3 is constructed as a set of adders. The delay circuit 2 is typically provided with a memory, a write counter and a read counter, in order to easily set the delay value. The delay amount is obtained by shifting addresses of the respective counters and accessing the memory. The actual example of the pixel processing circuit is as shown in FIG. 3. The retrieval pixel holding circuit 11 and the reference pixel holding circuit 12 are constituted by flip-flops so as to be driven in response to the clock signals, respectively. Typically, a bit width of a circuit composed of the flip-flops is approximately 8 to 12 bits, depending on the accuracy of the image data. In a case of 8 bits, the detection of 255 (the maximum value of an unsigned 8-bit binary number) as the specific value by a detector 13 makes a gate circuit 16 to be disabled. This implies that the comparing results from the excessive are inhibited when the reference image is not square-shaped. Such a circuit is not necessary when the reference image is always square-shaped.

Figure 5:
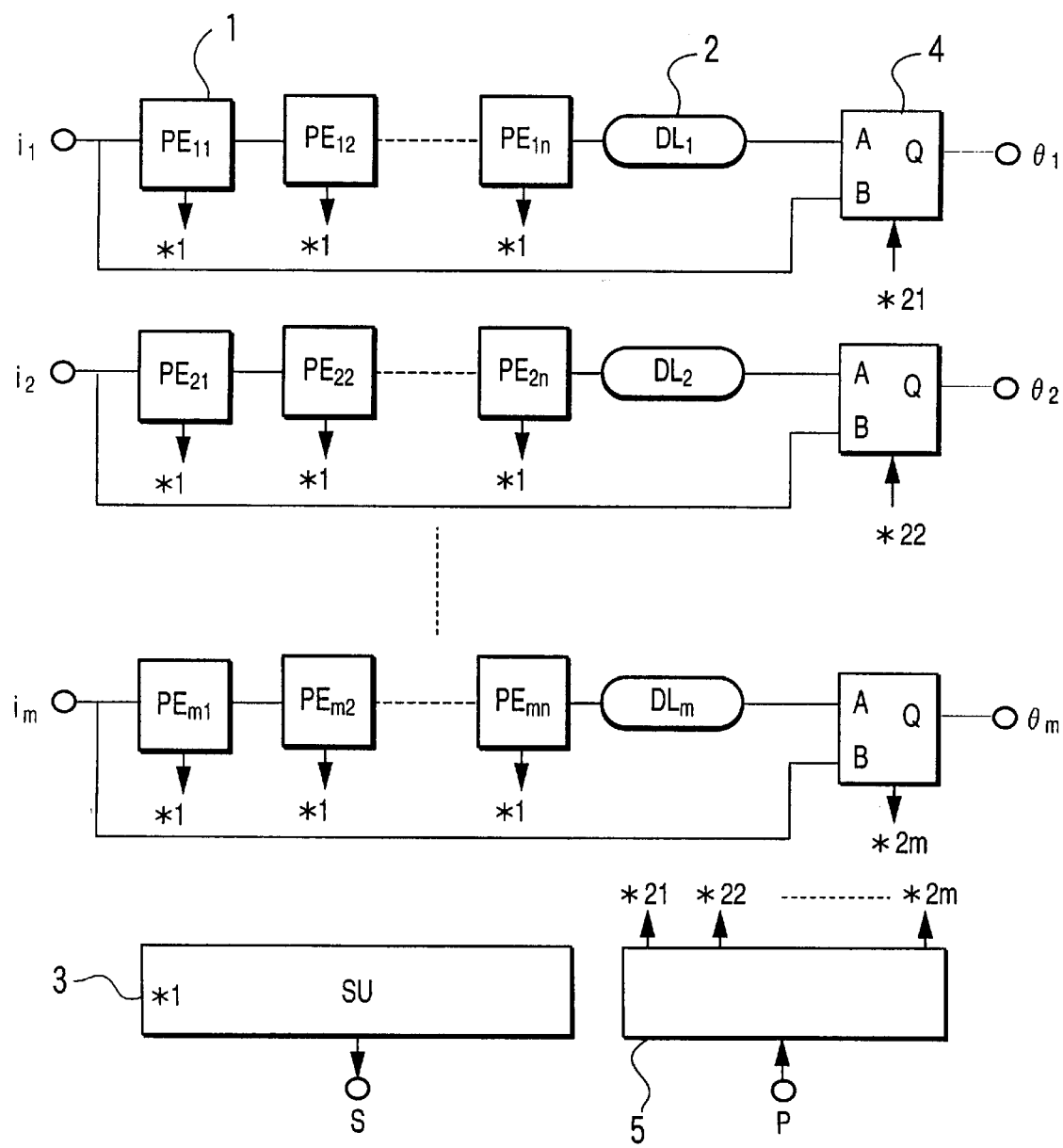
FIG. 5 is a block diagram showing the structure of the image inquiry apparatus according to a second embodiment of the present invention.

FIG. 5 is a view explaining the second embodiment of the present invention. This embodiment is accomplished as an integrated circuit to economically implement the structure in FIG. 2. For example, if m=16, it is presently difficult to implement the whole structure shown in FIG. 2 by using an economical one chip integrated circuit. Therefore, it is tried to divide the circuit shown in FIG. 2 into a plurality of circuit portions for the implementation. However, at that time, it is economical to use a plurality of integrated circuits having the same structure. This integrated circuit will be described below with reference to FIG. 5.

In FIG. 5, n pixel processing circuits $PE_{jk}$ (j=1, 2 . . . m, and k=1, 2 . . . n) are connected to one after another in series to construct a unit inquiry circuit which is connected to a terminal $i_j$. An output of the n-th pixel processing circuit $PE_{jn}$ is connected to a delay circuit 2 (a row inquiry circuit). Moreover, an output of the delay circuit 2 is connected to one input of a selecting circuit 4. The other input of the selecting circuit 4 is connected to the terminal $i_j$. An output Q of the selecting circuit 4 is connected to a terminal $\theta_j$. Considering the above-mentioned structure as one set (a unit inquiry circuit), m sets are provided within the integrated circuit. The processing results of mn pixel processing circuits are processed by the summing circuit 3. The processing result is outputted from a terminal S. Moreover, a selection signal holding circuit 5 is provided. The selection signal holding circuit 5 holds selection information for independently setting the respective selecting circuits 4. The selection information is inputted from a terminal P.

A method of implementing the structure shown in FIG. 2 by using such semiconductor devices will be described below. In a case of using the above-mentioned circuit at a first stage, the selection information is set such that a selecting circuit 4 on a first row selects $i_1$ and the other selecting circuits 4 select the outputs from the delay circuits 2. Hereafter, in a case of using in an x-th stage, the selection information is set such that a selecting circuit 4 on an x-th row selects $i_x$ and the other selecting circuits 4 select the outputs from the delay circuits 2.

Accordingly, the image inquiry circuit shown in FIG. 2 can be constructed only by connecting an output from the x-th stage to an input i at a (x+1)-th stage. If only one stage having the configuration shown in FIG. 5 can be contained by the integrated circuit, the similar configuration can be implemented by a connection outside the integrated circuit. Thus, the selecting circuit 4 is not always necessary. It is essentially necessary when integrating two stages or more.

In the above-mentioned descriptions, the terminals do not imply physical terminals. For example, in the second embodiment of the integrated circuit having the configuration in FIG. 5, an input buffer, or a latch depending on a case, may be connected immediately before the terminal i. The physical terminal may be connected to the inputs thereof. A terminal (not shown) of giving the delay value to the delay circuit 2 and the terminal P are tentatively used as the preparation for the check process. Thus, it is not economical to dispose a dedicated physical terminal. Hence, it is typically connected to the same physical terminal together with the terminal S through a two-way buffer and the like.

As a first effect of the present invention, the data which is conventionally inputted in duplication can be reduced, and the duplicate data is not required, and further the data transferring capability is lower than that of the conventional case. As a result, it is possible to economically implement the data transferring bus.

The reason will be described below. That is, although data is not transferred between a plurality of inquiry circuits as in the prior art, the same data is transferred to the inquiry circuit at a subsequent stage in the image inquiry circuit of the present invention. Hence, the data relative to it can be inquired without duplication. Especially, the image inquiry circuits with the m stages as shown in FIG. 2 enables the duplication to be perfectly canceled. Therefore, this provides the most effective merit.

As a second effect of the present invention, the inquiry circuits with the m stages are basically connected to each other in series. Thus, only a load relative to one stage is connected to the data transferring bus itself. Accordingly, it is possible to economically improve the clock frequency.

What is claimed is:

1. An image inquiry apparatus comprising:
   a plurality of unit inquiry circuits arranged in a matrix of m rows and r stages (each of m and r is an integer more than 1), wherein said plurality of unit inquiry circuits are generally connected in series in rows, except for said unit inquiry circuits of i-th row and (i+1)-th stage ($1 \leq i \leq$ a smaller one of m and r, and i is an integer), and wherein inputs of said unit inquiry circuits of i-th rows and (i+1)-th stages are respectively connected to inputs of said unit inquiry circuits of i-th row and i-th stage, and wherein each of said plurality of unit inquiry circuits comprises a plurality of pixel processing circuits connected in series, and outputs a calculation data corresponding to a difference between a reference pixel and a retrieval object pixel which are both held therein; and r summing circuits respectively provided, one for each said r stage of said matrix, wherein each of said r summing circuits sums said calculation data supplied from said pixel processing circuits in the corresponding stage to output the summing result.

2. An image inquiry apparatus according to claim 1, further comprising a delay circuit generally provided between every two connected in series unit inquiry circuits, except for the input of the i-th row and the (i+1)-th stage to delay transfer of the reference pixel or the retrieval object pixel from said one unit inquiry circuit to said other unit inquiry circuit.

3. An image inquiry apparatus according to claim 1, wherein each of said pixel processing circuits comprises:
   a first pixel holding circuit for holding a supplied pixel in response to a first clock signal to output the held pixel;
   a second pixel holding circuit connected to an input of said first pixel holding circuit, for holding the supplied pixel in response to a second clock signal;
   a subtracting circuit for performing subtraction between the pixel held in said first pixel holding circuit and the pixel held in said second pixel holding circuit to output a subtraction result; and
   a calculating circuit for calculating a square or absolute value of said subtraction result supplied from said subtracting circuit to output as said calculation data.

4. An image inquiry apparatus according to claim 3, wherein each of said pixel processing circuits further comprises:
   a gate for selectively outputting said calculation data supplied from said calculating circuit; and
   a detecting circuit for detecting that a data held in said second holding circuit is a pixel non-presence data and in response thereto inhibiting the gate.

5. An image inquiry apparatus according to claim 3, further comprising a control circuit for generating said first clock signal when the pixel supplied to each of pixel processing circuits of said matrix should be transferred to a next pixel processing circuit, and for generating said second clock signal when the pixel supplied to each of said pixel processing circuits of said matrix should be held in each of said pixel processing circuits.

6. An image inquiry apparatus according to claim 1, further comprising a pixel supply unit for supplying k rows ($1 \leq k \leq$ a smaller one of m and r) of a reference image of said reference pixels to be cyclically held in each of said k stages of said matrix from said first stage such that (p+q) or (p+q+k) is constant, where p is an integer to satisfy $1 \leq p \leq m$, q is an integer $1 \leq q \leq m$, the q-th row of said reference image is located at a top of said p-th stage of said matrix.

7. An image inquiry apparatus according to claim 6, wherein said pixel supply unit supplies, after the supply of said reference image, a retrieval object image in units of k rows to be held in said matrix, wherein when new k rows of said retrieval object image are supplied, the held k rows are shifted in a row direction.

8. An image inquiry apparatus according to claim 1, wherein said image inquiry apparatus comprises a plurality of semiconductor devices connected in series, and wherein each of said plurality of semiconductor devices includes:
   said m unit inquiry circuits for one stage;
   said summing circuit for said one stage; and
   a control signal generating circuit for generating a selection control signal for each of said m unit inquiry circuits, and
   wherein each of said m unit inquiry circuits comprises:
      said plurality of pixel processing circuits connected in series;
      a delay circuit connected to an output of a least one of said plurality of pixel processing circuits;
      a selector for selecting one of an output of said delay circuit and an input of a first one of said plurality of pixel processing circuits in response to said selection control signal.

9. A method of inquiring a reference image with a retrieval object image, comprising the steps of:
   providing image inquiry circuits of i stages, wherein each of said i stages includes unit inquiry circuits of j rows, each of said unit inquiry circuits including k pixel processing circuits connected in series;
   setting a reference image composed of reference pixels in each of said image inquiry circuits such that a first condition (a) that a m-th ($1 \leq m \leq j$, m is an integer) of said reference image is set in a (m+r−1)-th row ($1 \leq r \leq i$, r is an integer) of said image inquiry circuit of a r+th stage when (m+r−1)$\leq$j, and a second condition (b) that in a (m+r−1−j)-th row ($1 \leq r \leq i$, r is an integer) of said image inquiry circuit of a r+th stage, when (m+r−1)>j;
   after the setting of said reference image, setting a first group of j rows of a retrieval object image composed of retrieval pixels in said j rows of said image inquiry circuit of a first stage;
   calculating a calculation data corresponding to a difference between the set reference pixel and the set retrieval pixel in each of said pixel processing circuits of said image inquiry circuit of said first stage; and
   summing said calculation data supplied from said pixel processing circuit of said first stage to output the summing result.

10. A method according to claim 9, wherein each of said pixel processing circuits includes a first pixel holding circuit for holding a supplied pixel in response to a first clock signal and outputs the held pixel; and
   a second pixel holding circuit connected to an input of said first pixel holding circuit, for holding the supplied pixel in response to a second clock signal, and
   wherein said step of setting a reference image includes:
   transferring each of said reference pixels from one of said pixel processing circuits to a next one of said pixel processing circuits by use of said first holding circuit; and
   holding the transferred reference pixel in said second holding circuit.

11. A method according to claim 10, further comprising the step of delaying transfer of the reference pixels between two of adjacent states in a row direction.

12. A method according to claim 10, wherein said calculating step includes:
   performing subtraction between the retrieval pixel held in said first pixel holding circuit and the reference pixel held in said second pixel holding circuit to output a subtraction result; and
   calculating a square or absolute value of said subtraction result to output as said calculation data.

13. A method according to claim 10, wherein said calculating step further includes detecting that a data held in said second holding circuit is not the reference pixel, to output an output control data.

inhibiting the calculation data from being outputted.

14. A method according to claim 9, further comprising the steps of:

setting a next group of j rows of said retrieval object image to said j rows of said image inquiry circuit of said first stage while transferring the groups of j rows of said retrieval object image which are already set to a next stage in the row direction, wherein all the rows of the group of j rows set in the (s−1)-th stage ($1 \leq s \leq j$, s is an integer) other than the (s−1)-th row are transferred to the k-th stage, and the same row as set in the (s−1)-th row of the (s−1)-th stage is set to the (s−1)-th row of the s-th stage;

when the next group of j rows of said retrieval object image is set, executing said calculating step and said summing step.

15. A method according to claim 14, further comprising the step of:

repeating said step of setting a next group of retrieval object image and said executing step over an entire of said retrieval object image.

* * * * *

UNITED STATES PATENT AND TRADEMARK OFFICE
CERTIFICATE OF CORRECTION

PATENT NO. : 6,175,665 B1  
DATED : January 16, 2001  
INVENTOR(S) : A. Sawada

Page 1 of 1

It is certified that error appears in the above-identified patent and that said Letters Patent is hereby corrected as shown below:

Column 5,  
Line 7, "r + th" should read -- r-th --

Column 14,  
Line 30, "r + th" should read -- r - th --

Signed and Sealed this

Twelfth Day of February, 2002

Attest:

Attesting Officer

JAMES E. ROGAN  
Director of the United States Patent and Trademark Office